(12) United States Patent
Trevelyan (10) Patent No.: US 7,962,030 B2
(45) Date of Patent: Jun. 14, 2011

(54) FLASH THERMAL FEEDBACK FOR CAMERA AUTO-EXPOSURE

(75) Inventor: Philip A. Trevelyan, Camberley (GB)

(73) Assignee: Nokia Corporation, Espoo (FI)

( * ) Notice: Subject to any disclaimer, the term of this patent is extended or adjusted under 35 U.S.C. 154(b) by 204 days.

(21) Appl. No.: 12/284,600

(22) Filed: Sep. 22, 2008

(65) Prior Publication Data

US 2010/0074610 A1    Mar. 25, 2010

(51) Int. Cl.
*G03B 15/05* (2006.01)
(52) U.S. Cl. .................. 396/158; 396/157; 396/164
(58) Field of Classification Search .................. 396/158, 396/157, 164
See application file for complete search history.

(56) References Cited

U.S. PATENT DOCUMENTS

| | | | | |
|---|---|---|---|---|
| 4,908,552 A * | 3/1990 | Kumakura | ................. | 315/241 P |
| 6,778,769 B2 * | 8/2004 | Motomura | ...................... | 396/61 |
| 7,106,915 B2 * | 9/2006 | Dierickx | ....................... | 382/312 |
| 7,583,135 B2 * | 9/2009 | Ashburn et al. | ................ | 327/539 |
| 2005/0024511 A1 * | 2/2005 | Lapstun et al. | ................ | 348/294 |
| 2005/0089322 A1 * | 4/2005 | Uenaka | .......................... | 396/157 |
| 2008/0218618 A1 * | 9/2008 | Pfeffer et al. | .................. | 348/294 |
| 2009/0175613 A1 * | 7/2009 | Thorn | ............................ | 396/158 |

OTHER PUBLICATIONS

"Measuring LED Junction Temperature", Jeff Hulett and Chris Kelly, (Jul. 2008, http:www.photonics.com//content/spectra/2008/July/LED/92549,aspx, last visited Sep. 5, 2008), 4 pgs.

* cited by examiner

Primary Examiner — W. B. Perkey
Assistant Examiner — Bret Adams
(74) Attorney, Agent, or Firm — Harrington & Smith (57) ABSTRACT

An intensity of a second flash is determined based at least partly on a predicted thermal condition that is influenced by a first flash that is previous to the second flash. A quality function of an image capture device is adjusted according to the determined intensity of the second flash. A scene is illuminated by the second flash at the determined flash intensity and the illuminated scene is captured and stored as an image using the adjusted quality function. In exemplary embodiments, an auto-exposure algorithm is compensated for flash intensity, which is maximized in view of temperature limits and constraints due to firing a pre-flash prior to capturing the image. Various approaches and apparatus and software are detailed.

31 Claims, 7 Drawing Sheets

FLASH THERMAL FEEDBACK FOR CAMERA AUTO-EXPOSURE

TECHNICAL FIELD

The teachings herein relate generally to camera that use thermal feedback to control flash intensity, and are particularly directed to using that thermal feedback to optimize other camera functions apart from the flash.

BACKGROUND

Many mobile phones use a light emitting diode (LED) flash to improve image quality in low light conditions. The output power of these LED's has previously been limited by the amount of current that could be taken from the battery without tripping it's short circuit protection or exceeding the component's thermal limits, especially in multiple image capture situations (e.g., video or fast sequential image capture).

However, recent advances in LED technology and the commercial introduction of 'super capacitors' means that it is now feasible to pass high currents through a LED flash without tripping the battery and producing light intensities approaching those of a Xenon flash. Examples of such supercapacitors include the G and GZ series supercapacitors in the BriteFlash™ architecture by Cap-XX, Inc. of Sydney, Australia. Supercapactirors are also known as electrochemical mdouble layer capacitors (EDLC). Unfortunately, a mobile phone's internal temperature range varies commonly between 0° C. and 55° C., which severly limits the performance of practical implementations of such high-current embodiments to lower power levels so as to operate the LED safely at the higher end of that temperature range.

For the case where cameras have employed a pre-flash function (e.g., operating the flash immiedately prior to exposing the imaging surface/charge coupled display CCD during which time the flash is operated again to illuminate the scene being captured, commonly known as a red-eye reduction mode), the flash intensity has generally been kept the same for both the pre-flash and the full flash, and in both instances was kept within conservative thermal limits via designing the camera system operation for high ambient temperature.

It is also known that LED temperature can be measured or predicted based on its mathematical relation to forward voltage. From the temperature, thermal resistance of the LED junction can be calculated so as to predict a time delayed temperature at the LED once the voltage is removed, which of course may be accelerated by heat sinking the LED. Relevant and more detailed teachings in this regard may be seen at a paper by Jeff Hulelt and Chris Kelly entitled "Measuring LED Junction Temperature" (July 2008, http://www.photonics.com//content/spectra/2008/July/LED/92549.aspx, last visited Sep. 5, 2008).

Now arises a problem in that the confined spaces of a mobile phone or other handheld apparatus having an imaging function with a flash lead to the higher internal temperatures as noted above, which is where the imaging components lie. That same space constraint largely prevents increasing the heat sinking capacity about the LED since that would require thermal volume or a moving air mass. Those problems converge in the higher current LED implementations noted above. The higher LED forward current leads to higher heat outputs and thus a higher ambient temperature within the imaging apparatus, but there is no space available there to increase heat sinking via either volume or airflow.

It is well known that in low ambient light conditions a brighter flash is needed to adequately illuminate a scene for imaging, whether film or digital. But the super capacitor embodiments noted above rely on higher current, and so result in higher LED temperatures when flashing, and longer cooling periods absent improved heat sinking. Operating the flash at a lower than maximum intensity to account for design thermal constraints results in a degraded image quality because the deeper shadows in the scene are not sufficiently illuminated. Allowing a sufficient time for the LED to cool so as to operate it safely at maximum intensity would lead to a delay between the pre-flash and the main flash which in some instances, particularly in a mobile device with the Xenon-like higher intensity LEDs as above, may be so extended as to defeat the red-eye reduction purpose of the pre-flash. Additionally, consumers become readily frustrated by an extended delay between instances of sequential imaging because they may sometimes fail to capture an image they desire, such as when the subject in a scene is moving or changing facial expression.

These teachings are directed to addressing the above referenced problems.

SUMMARY

In accordance with one embodiment of the invention is a method that includes determining an intensity of a second flash based at least partly on a predicted thermal condition that is influenced by a first flash that is previous to the second flash; adjusting a quality function of an image capture device according to the determined intensity of the second flash; and illuminating a scene by the second flash at the determined flash intensity and capturing and storing an image of the illuminated scene using the adjusted quality function.

In accordance with another embodiment of the invention is a memory embodying a program of machine readable instructions that when executed by a processor result in actions directed to operating an image capture device. In this embodiment the actions include determining an intensity of a second flash based at least partly on a predicted thermal condition that is influenced by a first flash that is previous to the second flash; adjusting a quality function of an image capture device according to the determined intensity of the second flash; and illuminating a scene by the second flash at the determined flash intensity and capturing and storing an image of the illuminated scene using the adjusted quality function.

In accordance with another embodiment of the invention is an apparatus that includes a processor, a flash actuator, a local memory and an image capture device that includes a pixel array, a read-out integrated circuit and a flash actuator. The processor is configured to determine an intensity of a second flash of the flash actuator based at least partly on a predicted thermal condition that is influenced by a first flash of the flash actuator that is previous to the second flash, and to adjust a quality function according to the determined intensity of the second flash. The quality function may be an algorithm stored in the memory. The image capture device is controlled by the processor so as to illuminate a scene by the second flash of the flash actuator at the determined flash intensity so as to capture and store in the local memory an image of the illuminated scene using the adjusted quality function.

In accordance with another embodiment of the invention is an apparatus that includes processing means, storing means and image capturing means that includes pixel means, read-out means and flash actuating means. The processing means is for determining an intensity of a second flash based at least partly on a predicted thermal condition that is influenced by a first flash that is previous to the second flash, and to adjust a quality function according to the determined intensity of the second flash. The quality function is executed by the processing means and stored as computer readable instructions in the memory means. The flash actuating means is for emitting the first flash and the second flash. The image capturing means is under control of the processing means and is for illuminating a scene by the second flash at the determined flash intensity so as to capture and store in the memory means an image of the illuminated scene using the adjusted quality function. In a specific embodiment the processing means is a processor, the memory means is a computer readable memory, the image capturing means is a camera having a pixel array and a read-out integrated circuit, and the flash actuating means is a light emitting diode.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Embodiments of this invention relate to operating camera flash at its optimal output power (optimal as required by the camera's auto-exposure algorithm) by monitoring and predicting the flash's junction temperature and feeding this information back to the auto exposure algorithm. This algorithm can then adjust the camera settings to account for any changes in flash power on a flash by flash basis. In this manner the camera settings, such as exposure time/pixel integration time and camera gain, are adjusted to account for the reduced flash intensity that is necessitated by the pre-flash or the flash used for a previous photo. Flash use is safely enabled on both single and multiple image captures for the first time.

Because the flash, which is being operated at a reduced intensity due to the pre-flash or previous photo, is being operated simultaneously with the charge coupled device CCD being exposed to the scene being flashed, there is a prediction employed for predicting the flash intensity to which the camera's settings are optimized. This can be done based at least partly on historical data in which the camera does not need to have any real time measurement capacity of flash junction termperature or voltage such as a stored table giving flash temperature or intensity as a function of time since the last flash/pre-flash, or more preferably there is a real-time measurement of voltage or junction temperature for more accurate prediction of that the actual termperature/intensity will be at the time the scene is captured as illuminated by the flash.

This can be achieved in several ways, three of which are summarized below.

By measuring the instantaneous ambient temperature of the LED flash environment and predicting the LED junction temperature rise using a model or Look Up Table (LUT).

Measuring the instantaneous ambient temperature and the pre-flash LED junction temperature rise and using this data to predict the full flash temperature rise.

Measure the ambient temperature from the pre-flash absolute LED junction voltage and thermal dissapation from the change in LED junction voltage temperature rise and use this data to predict the full flash temperature rise.

Generally stated, embodiments of the invention determine an intensity of a second flash based on a thermal condition (e.g., temperature due to the second flash) that is influenced by a first flash that is previous to the second flash (where the first flash may be a pre-flash or a flash from a previous photo). The thermal condition can be measured at a temperature sensor built into the substrate of the LED flash, or it may be predicted based on the voltage/current during the previous flash (of which the voltage/current or other electrical parameter may be actually measured or simply read from the voltage/current that is applied which results in the first flash). A quality function of an image capture device/camera is then adjusted according to the determined intensity of the second flash. At this juncture the second flash has not yet been executed; the camera functions are simply pre-set in preparation for it. The quality function may be embodied as an auto-exposure algorithm, a camera gain, a white-balance algorithm, an image quality filter function, or the like, each of which is executed on the image being captured prior to the time the image is first stored in a memory of the camera/apparatus. Then, the image is captured (and stored in the memory) as illuminated by second flash at the determined flash intensity and using the adjusted quality function. The LED may be considered more generally as a flash actuator to keep distinct the hardware flash actuator from the first and second visible light flash that it emits.

One exemplary regimen for such a real-time monitoring is as follows:

The ambient temperature for the flash is continuously monitored prior to capturing an image.

Prior to the pre-flash, the flash junction temperature is predicted for the required flash power and measured during the pre-flash to reduce measurement error.

The thermal algorithm then calculates the maximum current that can pass through the (full) flash based at least partly on its thermal flash model, the ambient temperature and the calibration data from the previous flash/ videolight /auto focus assistance light data. Note that instead of a pre-flash (or in addition to it), the junction temperature may rise a bit due to the LED firing (flash or continuous) in order for the auto-focus settings to be computed. This auto-focus assistant light or videolight may also be accounted for by these teachings.

The maximum predicted (full) flash current value is then used by the auto exposure algorithm to adjust the camera system setting for the optimal image quality before the picture is taken using (full) flash.

The auto exposure algorithm used in these embodiments may use a small intensity pre-flash (in this case to reduce heating in the LED die) to calculate the auto exposure settings. This is followed, after a delay of approximately 700 ms, by a high intensity (full) flash pulse to capture the final image (See FIG. 2 detailed below). In this embodiment of this invention the auto-exposure algorithm adjusts the full flash intensity based at least partly on the scene, and also depending partly on the flash junction temperature within the phone.

Figure 1A:
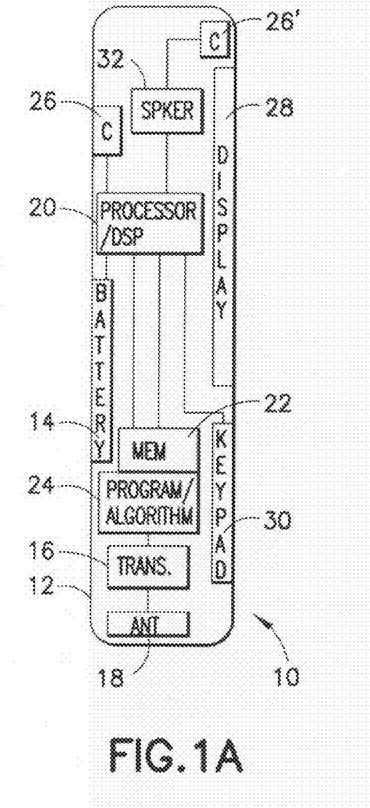
FIGS. 1A-1C illustrate schematic diagrams of various electronic devices in which various aspects of the invention detailed herein may be embodied.
Figure 1B:
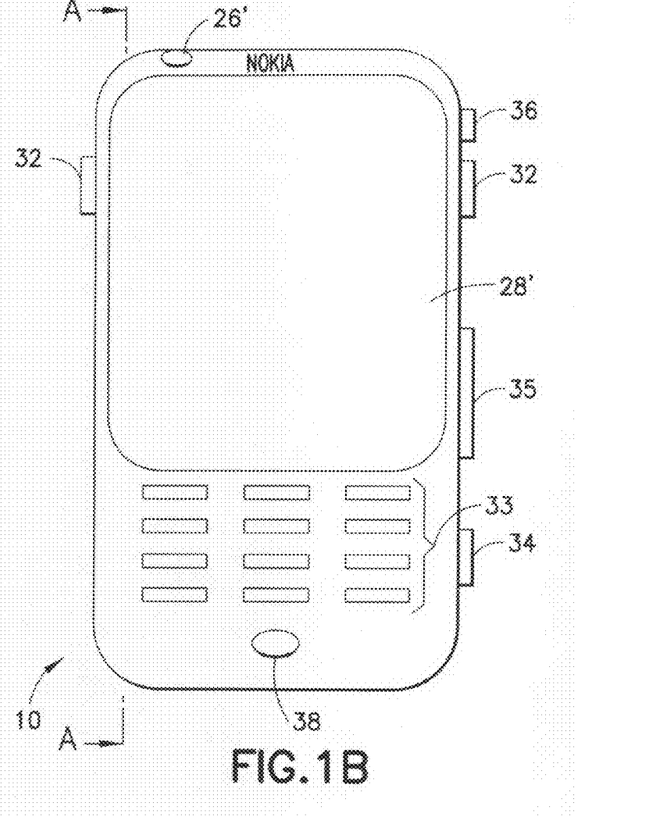
Figure 1C:
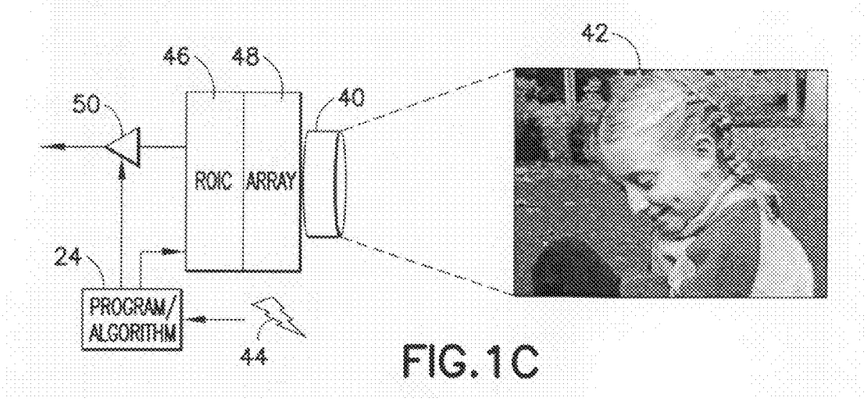

Prior to detailing the invention further, FIGS. 1A-1C are now detailed to show exemplary apparatus in which the invention may be embodied. While these descriptions are in the context of a camera disposed within a mobile phone/mobile terminal, embodiments of this invention are not limited to such communication devices and can readily be extended to traditional digital cameras that are not disposed within a mobile phone housing, as well as processors and computer programs stored on a computer readable medium that operate such a camera. The mobile phone embodiment is detailed herein simply because the space constraints there are seen to represent the most challenging environment to deal with photodiode/LED junction temperature limitations noted above, and therefore the mobile phone camera implementations are seen to exhibit the most pronounced technical effect of these teachings.

FIG. 1A is a sectional view along section line A-A of FIG. 1B which shows a face of a mobile phone 10. Internal to the housing 12 is a battery 14 or other portable galvanic power source that supplies electrical power to all components therein. The phone 10 may be operating in a wireless network in which the transceiver 16 communicates via one or more antennas 18 with an access node (e.g., base transceiver station, WLAN access point) or another mobile phone (e.g., device to device communications) as controlled by the processor 20 which may include one or more digital signal processors DPSs, application specific integrated circuits ASICs, and the like. There is a memory 22 that stores various programs 24 including the algorithm detailed by example below by which the processor 20 controls a camera 26, 26' according to these teachings. The phone 10 may include a rear-facing camera 26 facing the rear of the phone 10 opposite the display screen 28' and a forward-facing camera 26', though the camera or cameras may be disposed at various locations and along various faces of the housing 12 other than those shown. The processor provides data to the display screen 28' via the display interface 28, and where the display screen 28' is touch-sensitive may also receive user inputs therefrom such as user selection of red-eye reduction mode/pre-flash mode for either of the cameras 26, 26'. The processor 20 also receives inputs from the keypad interface 30, which converts inputs at the traditional number/letter keys 33 to electrical signals as well as inputs at a camera actuator 34, camera zoom actuator 35, and power on/off actuator 36. Other implementations may provide the camera actuator and camera zoom functions as soft key inputs from the traditional keys 33 or as touch-screen entries at the display screen 28' as known in the art. There are also one or more speakers 32 and at least one microphone 38 for transducing between electrical and audible signals which are shown for completeness.

The various connections between the described components shown at FIG. 1A are exemplary and not limiting, and certain connections are not shown so that the more relevant elements of the invention may be shown more clearly. The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs 24 is assumed to include program instructions that, when executed by the associated digital processor 20, enable the electronic device to operate in accordance with the exemplary embodiments of this invention, as summarized above and detailed more particularly below. Inherent in the processor 20 is a clock/oscillator to enable synchronism among the various communication components, and that same clock may be used to predict temperature for the LED junction after a pre-flash or after a previous full flash according to these teachings.

The program/algorithm 24 may be embodied in software, firmware and/or hardware, as is appropriate. In general, the exemplary embodiments of this invention may be implemented by computer software stored in the memory 22 and executable by the processor 20 of the apparatus 10, or by hardware, or by a combination of software and/or firmware and hardware in the apparatus 10 shown by non-limiting example as a mobile phone.

In general, the various embodiments of the apparatus 10 can include, but are not limited to, mobile stations, cellular telephones, personal digital assistants (PDAs) having image capture capabilities, image capture devices with or without wireless communication capabilities, gaming devices having image capture capabilities, music storage and playback appliances having image capture capabilities, Internet appliances permitting wireless Internet access and browsing and local image capture, as well as portable units or terminals that incorporate combinations of such functions.

The memory 22 may be of any type suitable to the local technical environment and may be implemented using any suitable data storage technology, such as semiconductor-based memory devices, magnetic memory devices and systems, optical memory devices and systems, fixed memory and removable memory. While shown as one component, the memory may in fact be represented in multiple distinct components within the apparatus 10 with portions of the program/algorithm 24 stored at different locations. The processor 20 may be of any type suitable to the local technical environment, and may include one or more of general purpose computers, special purpose computers, microprocessors, digital signal processors (DSPs), application specific integrated circuits (ASICs), read-out integrated circuits (ROICs), and processors based on a multi-core processor architecture, as non-limiting examples.

At FIG. 1C is shown a schematic block diagram of relevant components of the camera 26, 26'. An optical lens 40 captures a scene 42 to be imaged according to these teachings in which thermal or voltage feedback from a light emitting diode 44 (or other implementation of a flash actuator) is used by the program/algorithm 24 to control the camera's auto-exposure function via read-out integrated circuit (ROIC) 46 that reads out from the pixel array 48. For embodiments that include a super capacitor, it may be considered to be co-located with the LED 44 shown at FIG. 1C and supplying input current thereto, and such a super capacitor may be considered to form a component of the overall flash actuator. It is noted that while voltage feedback is used in this description, current or other electrical parameter(s) may also be fed back in other embodiments without departing from these teachings so long as there is a known temperature dependence on the electrical parameter being fed back from the flash actuator 44. Any or all of the camera gain 50, automatic white-balancing, image quality noise filtering and switching frequency/driving signal amplitude of the camera's auto-focus piezo motors (or other elements of the auto-focus drive system) may also be controlled by the temperature/voltage feedback according to these teachings, all of which are controlled prior to the captured image 42 being first stored in the memory 22 after being read out from the ROIC 46. All of these adjustments based on temperature/voltage are automatically implemented once the user depresses the image capture actuator 34, though in some instances it may be predicated on the camera first being in a red-eye reduction mode, which in some cameras may be a default mode and in other cameras may be manually selected by the user such as via the keys 33.

Now are described specific embodiments of how thermal feedback can be used to optimize the performance of LED flash actuator 44 when used with a high current supply (e.g. one or more super capacitors in an image video engine such as the array 48/ROIC 46). While this approach can be applied to any flash pattern used during image capture, an advantageous implementation is seen to employ a pre-flash of minimal intensity. This pre-flash intensity should be low enough to reduce energy consumption and to prevent excessive increase in flash junction temperature, while still achieving reliable auto-exposure action in the presence of increased image noise. At FIG. 2 are shown time graphs for the first and second flashes, with intensity shown at the middle plot.

The top graph shows various modes for using an LED flash. At a time previous to the pre-lash when the camera is activated (e.g., the lens aperture is opened), the auto-exposure and auto-white balancing algorithms prepare for the image capture by converging 202 to an optimal solution for the given flash intensity that is expected once the image is captured. At 204 is shown the first flash, which is indicated as a pre-flash (for the IVE red-eye reduction mode) but which may also be a full flash for a first image capture event where the second flash 206 is simply a quick-sequential image capture event after the first (and where the IVE mode is fast-sequential imaging for example). The delay between first and second flashes is set to optimize red-eye reduction as known in the art for the red-eye reduction mode, and is set to allow the flash intensity of the second flash to be maximized in the fast-sequential imaging mode.

Figure 2:
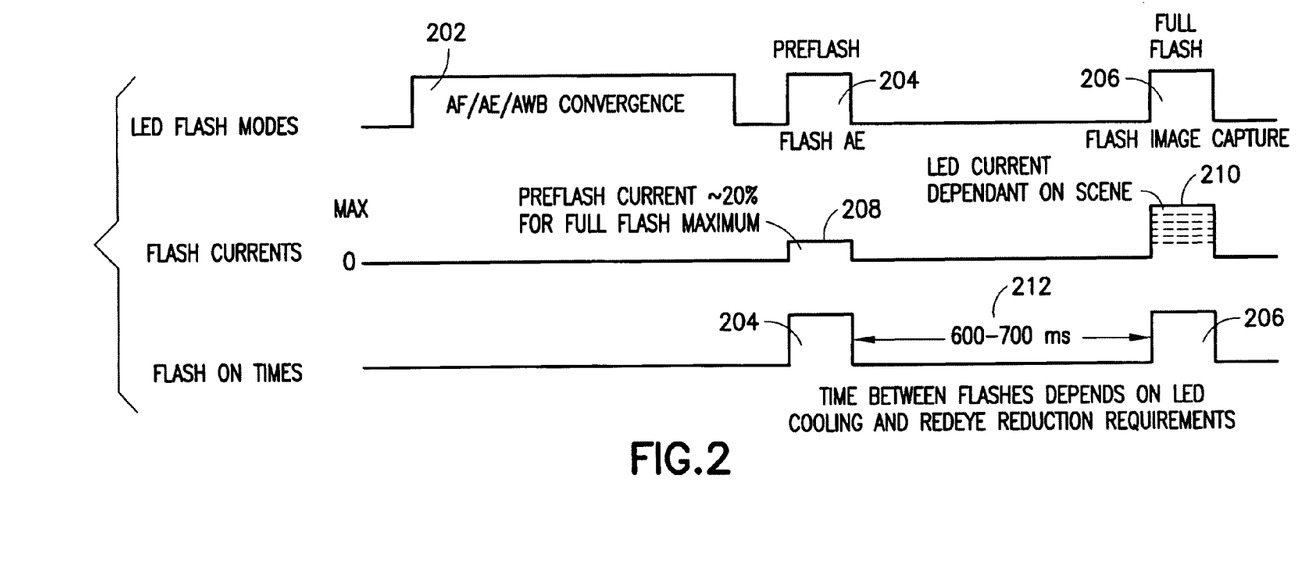
FIG. 2 is a series of timing diagrams showing flash patterns for first and second flashes according to exemplary embodiments of the invention.

The center plot of FIG. 2 shows with reference to the red-eye reduction mode flash intensity of the first and second flashes. The pre-flash is at a first intensity 208 that is reduced according to these teachings so as to allow a maximum or full flash intensity 210 for the second flash, given thermal constraints on flash intensity due to the first flash. It is noted that the full flash intensity does not always necessarily mean maximum possible intensity of the LED given the thermal constraints due to the pre-lash noted above; the full flash may in some camera algorithms be limited below that maximum possible intensity by software in dependence in on the scene 42 being imaged. The auto-exposure and auto-white balancing algorithms converge 202 to the optimum solution that is computed to achieve maximum image quality for the scene 42 being imaged (given any constraints as to stored/captured image size as is known in the art). Cleary in some instances that may be maximum intensity for which the LED is capable (as limited by the thermal considerations due to the first flash as noted above) and in other solutions it may be a bit reduced, but the full flash is set in dependence on the scene 42 as may be further limited by the thermal considerations detailed herein. In this embodiment the pre-flash is purposefully set to a reduced level that allows the full flash computed in dependence on the scene to be achieved. That is, in this embodiment the intensity of the pre-flash is computed so as to assure that thermal constraints on the full flash do not reduce its intensity to a level below that which is optimized for the scene to be imaged 42.

Now at the lowermost plot of FIG. 2 is shown that the full or second flash 206 occurs after a delay 212 of some 600-700 ms (which is simply an example and not limiting as to the delay) after the first/pre-flash 204. This is to optimize red eye reduction and to ensure maximum cooling of the LED junction. The intensity of this second flash 206 is dependent on the local temperature conditions of the LED prior to use (which will reduce its intensity from maximum as the junction temperature increases) and the flash intensity required from the scene 42 (i.e. highly reflective scenes require a lower intensity flashes than darker scenes).

While the delay 212 may be adjusted somewhat, it must be remembered that there is an external constraint to such adjustment in that the pre-flash must be able to accomplish its purpose and reduce the red-eye effect of digital imaging. Too much delay and the red-eye reduction potential will be wasted due to image capture after the pre-flash has dissipated too much; too little delay and the red-eye reduction due to the pre-lash will not have yet had sufficient time to take noticeable effect, and temperature constraints will be more stringent due to the lesser time for heat to dissipate. Thus increasing the delay between pre-flash 204 and flash 206 is seen as offering very limited relief to the temperature constraints on the LED flash discussed herein.

To accurately predict the temperature at the LED at the time of the main flash 206 due to the pre-flash 204, and also to determine the intensity 208 of the pre-flash so as to enable the optimized intensity 210 of the main flash 206, one exemplary solution is to modify existing auto-exposure algorithms for thermal feedback, such as those auto-exposure algorithms normally found in mobile phones with a camera. For some mobile phone models this may require slight modification of the hardware in order to monitor the LED junction temperature.

In other modifications a simple lookup table may be used that stores pre-determined associations of voltage/current applied at the LED for the pre-flash and temperature at the LED for the flash that depends on the time-delay 212 and the intensity 208, 210 of both flashes. For example, assuming the delay 212 is fixed, the lookup table is entered with the optimized flash intensity 210 computed by the AF/AE/AWB convergence 202 (auto-focus/auto-exposure/automatic white balance) that depends on the scene 42, the reduced flash intensity 208 is found, and then applied to the LED at the time of the pre-flash 204 so that the full flash intensity 210 may be used at the full flash 206. The lookup table assures temperature constraints are met based at least partly on design data of the phone 10. Where a full flash intensity is too great for a pre-flash, there is no correspondence in the lookup table and the algorithm knows another solution must be found. Where the lookup table gives no reduced flash intensity 208 for a given entry of full flash intensity 210, then the table is entered with a next lower full flash intensity until a corresponding reduced flash intensity for the pre-flash is found, and those intensities are used in the sequential flash operations. It is noted that one design concern in current super capacitor embodiments is the electrical profile at low ambient temperature. In certain embodiments and at lower temperatures at the junction itself or near the LED, effects of the equivalent series resistance (ESR) in the super capacitor is used to correct the thermal prediction model that predicts temperature for the second flash after the pre-flash/first flash. ESR is well known in the art and typically provided by super capacitor manufacturers, and correction for low temperature ESR may be implemented in these teachings via a lookup table stored in the local memory or an intrinsic model/algorithm that gives the low temperature correction.

Figure 3:
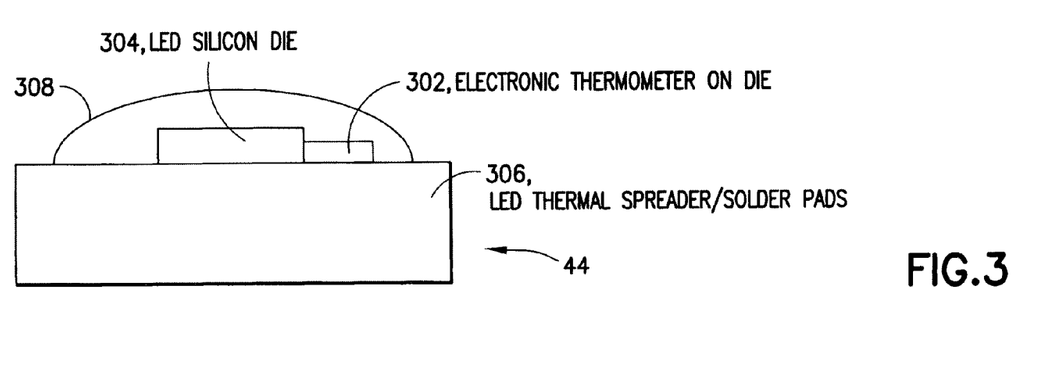
FIG. 3 is an embodiment of a LED having a thermometer mounted adjacent thereto and on a common substrate to obtain feedback for predicting thermal condition due to the second flash in accordance with an exemplary embodiment of the invention.

Returning now to embodiments that use actual measurements to determine the temperature, one solution is seen to measure the LED junction temperature directly using a solid state thermometer as seen in the embodiment of FIG. 3. The electronic thermometer 302 is disposed within a protective dome 308 with the LED die 304, all of which are manufactured together and mounted to a common substrate 306. This is a fairly simple solution but as noted above requires a hardware change and therefore is not readily implementable with legacy camera devices.

Another embodiment of active measurement for image capture devices in which there is not a temperature sensor 302 disposed with the LED 304 employs measuring the printed wiring board/heat sink temperature of the LED and monitoring the LED's junction temperature using an analog to digital converter (ADC) to monitor the diode's forward voltage $V_{(f)}$. This is shown more particularly at FIG. 4. In certain embodiments the heat sink 402 will be the printed wiring board pwb itself. A temperature dependant resistor 404 is mounted to the pwb 402 and coupled to the ADC 406 to provide an accurate reference ambient temperature. The flash LED's (diode) forward voltage $V_{(f)}$ is also measured by the ADC 406 to measure the rise in junction temperature from the change in forward voltage $V_{(f)}$. The output 412 of the ADC 406 is then the forward voltage $V_{(f)}$ of the diode 408 influenced by the current through the LED flash 44, or when selected the output 412 may be the ambient temperature at the heat sink 402 calculated from the temperature dependant resistor 404. Of course, the temperature dependent resistor 404 must be disposed in close proximity to the diode 408 in order that its influence on the ADC output 412 is somewhat reflective of the diode temperature.

Figure 4:
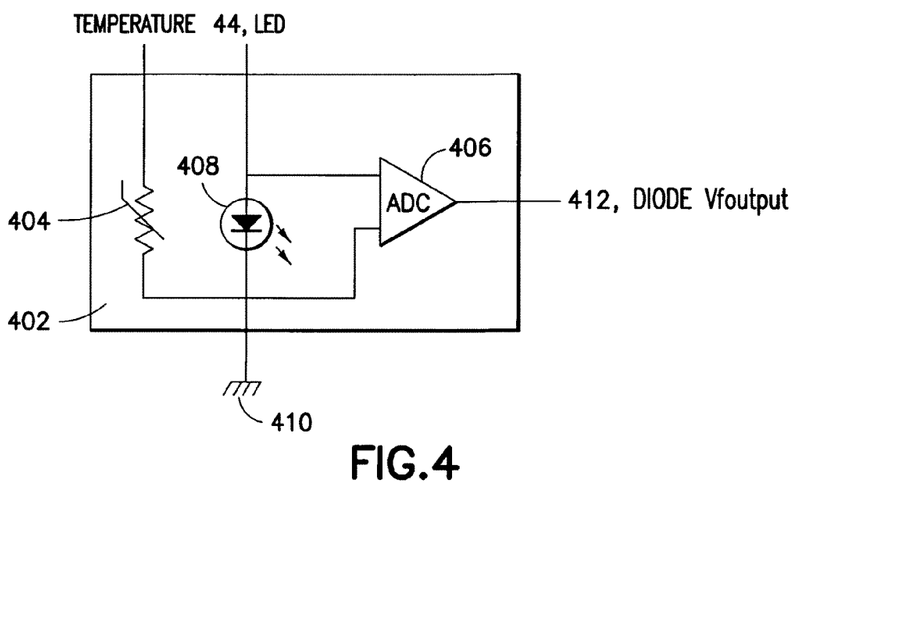
FIG. 4 is an embodiment of an alternative circuit to FIG. 3 for obtaining thermal feedback to predict thermal condition due to the second flash according to another exemplary embodiment of the invention.

However the measurement is taken, by the above exemplary embodiments or others, certain embodiments may require measuring/simulating some or all of flash power $F_p$, LED junction temperature $T_j$, thermal dissipation $P_d$ and thermal time constant $\tau$ from the LED flash design in order to predict the rise in LED junction temperature. These are related as follows:

$$F_p = V_f \times I_d$$

$$T_j = \frac{\Delta V_f}{T_c}$$

where $V_f$ = diode forward voltage $T_c$ = diode temperature constant $I_d$ = LED current The diode forward voltage may be obtained from the output 412 from FIG. 4 as described above. The diode temperature constant is pre-set, generally given by the LED manufacturer (typical values are around 3 mV/° C.). The LED current may be taken from the known current that is applied by the camera/mobile phone itself, or it may be measured directly.

Figure 5:
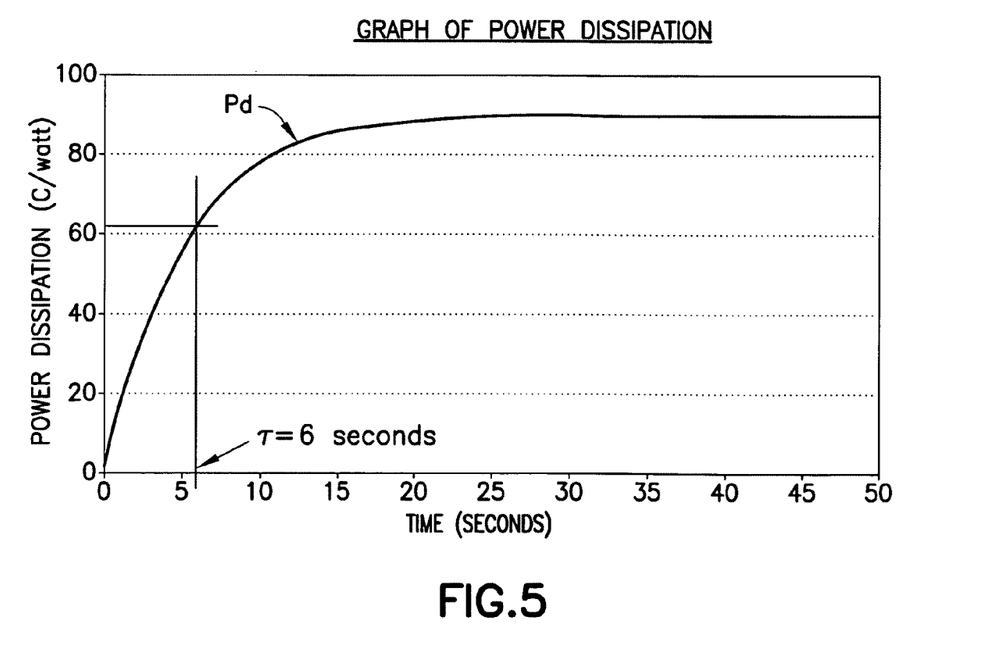
FIG. 5 is a graph of power dissipation used for calibrating the thermal feedback loop according to an exemplary embodiment of the invention.

To calculate the power dissipation and thermal time constant the LED must be illuminated with a current equivalent to that used with videolight. During this test the flash power $F_p$ and LED junction temperature $T_j$ are continuously monitored until the junction temperature has stabilized. A graph of the power dissipation transfer function i.e.

$$P_d = \frac{T_j}{F_p}$$

can then be plotted, as is done at FIG. 5, with power dissipation $P_d$ being the measured at time $T=0 \rightarrow \infty$ and thermal time constant $\tau=0.683 \cdot P_d$.

From this, the thermal junction prediction can be calculated as:

$$T_j = T_{ambient} + (T_{jPreFlash} - T_{jBlank} + T_{jFullFlash})$$

Where $$T_{jPreFlash} = P_d \cdot F_{p(Preflash)} \left(1 - e^{\frac{-t_{Preflash}}{\tau}}\right)$$

and $$T_{jBlank} = T_{jPreFlash} \left(e^{\frac{-t_{Blank}}{\tau}}\right)$$

where $$T_{jBlank} \geq T_{ambient}$$

and $$T_{jFullFlash} = P_d \cdot F_{p(FullFlash)} \left(1 - e^{\frac{-t_{Fullflash}}{\tau}}\right)$$

Ambient temperature ($T_{ambient}$) may be deduced from the temperature dependent resistor 404 of FIG. 4 when no flash has been used (e.g., lookup table relating temperature to current through the resistor 404), or measured directly by a thermometer. So by the above detailed examples, according to one embodiment of the invention shown at FIG. 3, a digital thermometer integrated circuit is mounted to the silicon substrate of the flash 44 and the feedback monitors the die temperature directly. This enables realtime monitoring of the LED die temperature and thermal predictions can be made based at least partly on thermal measurements made during Production testing of the phone and also in field use.

Since LED suppliers don't normally include this type of sensor within their LEDs and cost considerations garner against widescale adoption fo this approach in the short term, there is an alternative approach such as that shown at FIG. 4 in which the LED Vf is measured against temperature, the power dissapation of the heatsink printed wirting board in ° C./watt and the LED's thermal time constant is determined for the device as shown by example at FIG. 5. Then the ambient temperature within the phone/device and the $V_f$ of the LED can be measured during the preflash and the predicted temperature during full flash can be calculated using a look up table within the auto exposure algorithm.

A further embodiment is to employ a digital thermometer integrated circuit (e.g., Maxim DS1775 Digital Thermometer and Thermostat by Maxim Integrated Products, Inc. of Sunnyvale, Calif., USA) to monitor the printed wiring board/heatsink temperature close to the flash LED and use an analog to digital converter (e.g. National ADC121C021 by National Semiconductor Corp. of Santa Clara, Calif., USA) to measure the LED's change in forward voltage (Vf) as shown at FIG. 4. Then dynamically predict the full flash junction temperature rise from the pre-flash, ambient temperature rise and calibrated values from either laboratory testing or gained using the videolight.

Figure 6:
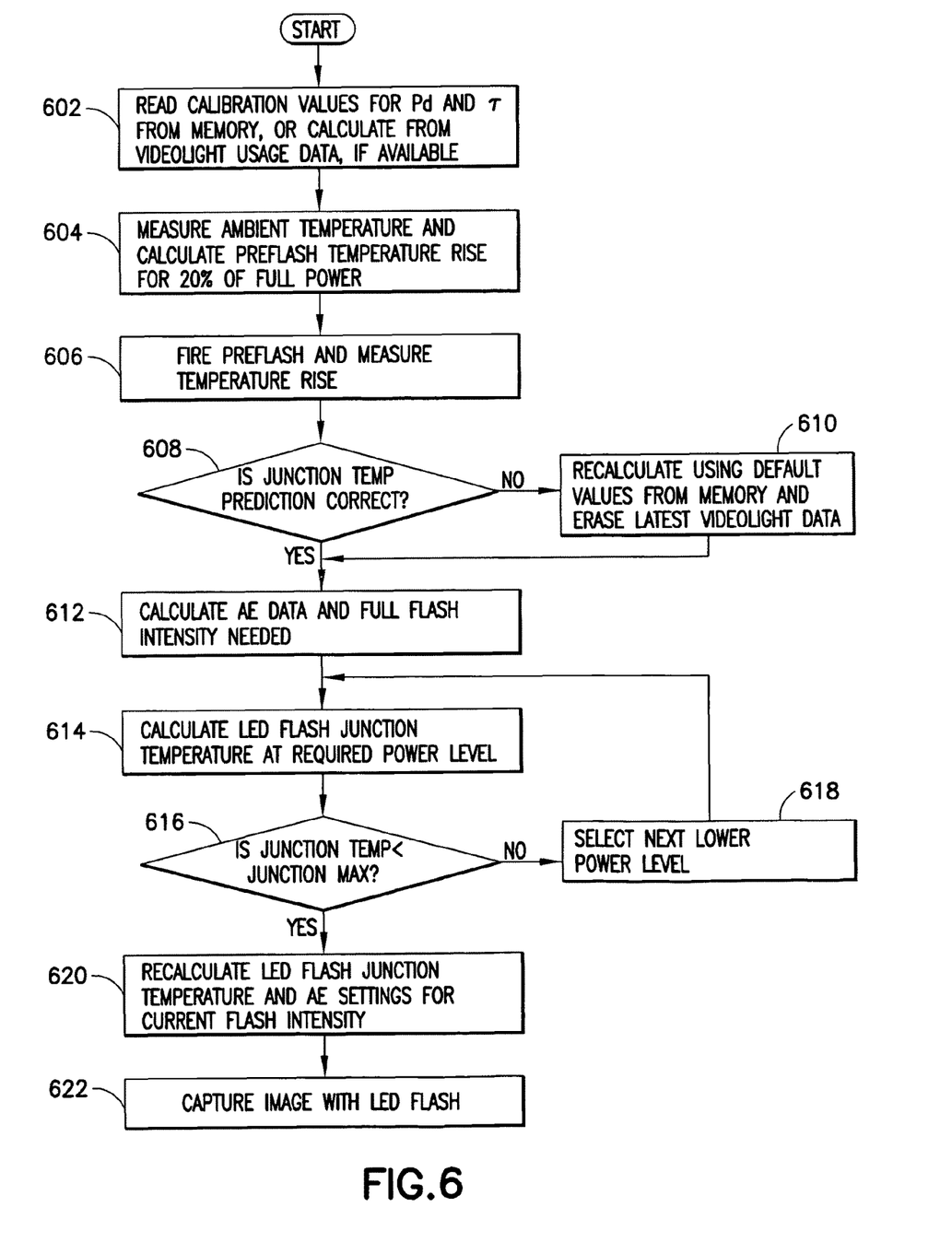
FIG. 6 is a detailed flow diagram showing process steps according to an exemplary embodiment of the invention.

This is shown at the process flow diagram of FIG. 6, which also continually updates the prediction algiorithm. At block 602 calibration values for thermal dissipation $P_d$ and $\tau$ are read from memory or calculated from, e.g., video light usage data. At block 604 the ambient temperature is measures (directly or via voltage/current or other electrical parameter) and the pre-flash temperature rise is calculated for the pre-flash intensity, 20% of full power as in the example above. At block 606 the pre-flash is actuated and the temperature rise is measured, then at block 608 it is checked whether the temperature rise predicted at block 604 matches that measured at block 606. If the match is not within tolerances then at block 610 the junction temperature for the full flash time is recalculated using some default value stored in the memory and the latest videolight data that led to the erroneous prediction is deleted. This is simply to check the data and not an iterative process. The default values are used for safety and reliability, for example if there is a problem with the temperature measurement that gives an erroneous result. In either case then at block 612 the auto-exposure data is calculated as well as the full flash intensity that is needed for the scene to be imaged. There is a power level associated with this full flash intensity, which at block 614 is used to determine the flash junction temperature that will result, given the time delay between the fired 20% pre-flash and the temperature measured from it at block 606. Then at block 614 it is compared whether the flash junction temperature that is computed at block 614 remains below (or equal to) a maximum allowable junction temperature.

If not then there will be a safety issue with using the full flash intensity, and so block 618 decrements the power level for the flash to the next lower intensity and feeds back to perform the safety check of block 616 again with the newly calculated flash junction temperature for the lower intensity. Once an intensity is found that satisfies the safety requirement checked at block 616, then at block 620 the flash junction temperature and auto-exposure settings are re-calculated for the flash intensity that was used to pass from block 616 to block 618. It is these settings that are used to fire the flash at block 622 and capture the image with maximum image quality.

Figure 7A:
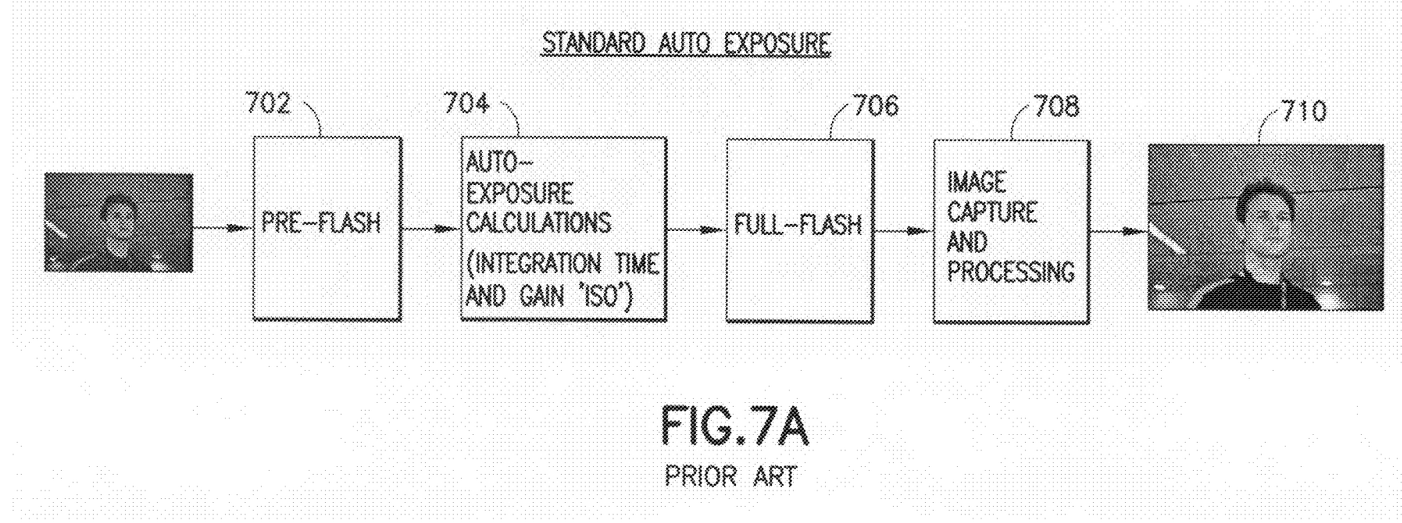
FIG. 7A shows conventional process steps for pre-flash and full flash and FIG. 7B shows corresponding process steps according to another exemplary embodiment of the invention.
Figure 7B:
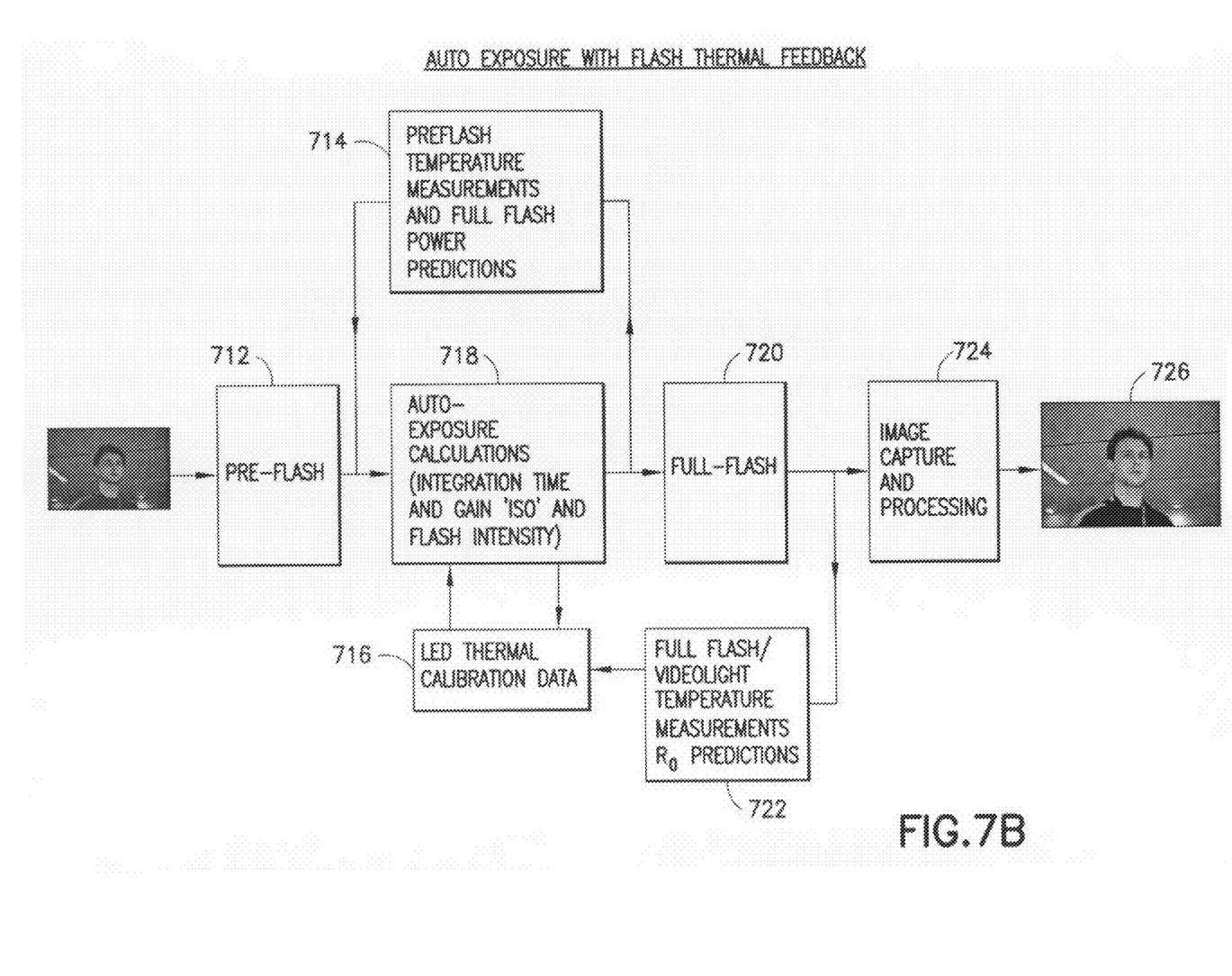

Shown in more general terms at FIG. 7B is a process flow diagram that highlights differences over what is assumed to be a conventional/standard approach at FIG. 7A. At FIG. 7A the conventional approach fires the pre-flash at block 702, the software computes the auto-exposure settings at block 704 (e.g., integration time for the pixel array), fires the full flash at block 706 and captures/processes the image at block 708 which is first stored (prior to any opportunity for user modifications) on the volatile memory at 710.

At FIG. 7B is shown according to an embodiment of the invention that the pre-flash is fired at block 712, which may be at a reduced (20%) intensity, and the auto-exposure calculations are predicated on that pre-flash 712 as well as pre-flash temperature measurements and full flash power predictions at block 714 and LED thermal calibration data at block 716. The full flash is fired at 720, the image is captured/processed at block 724 and first stored (prior to any opportunity for user modifications) on the volatile memory at 726. The thermal calibration data is updated at block 722 with the temperature/voltage/current measurements from the full flash 720 and the $P_d$ predictions.

Figure 8:
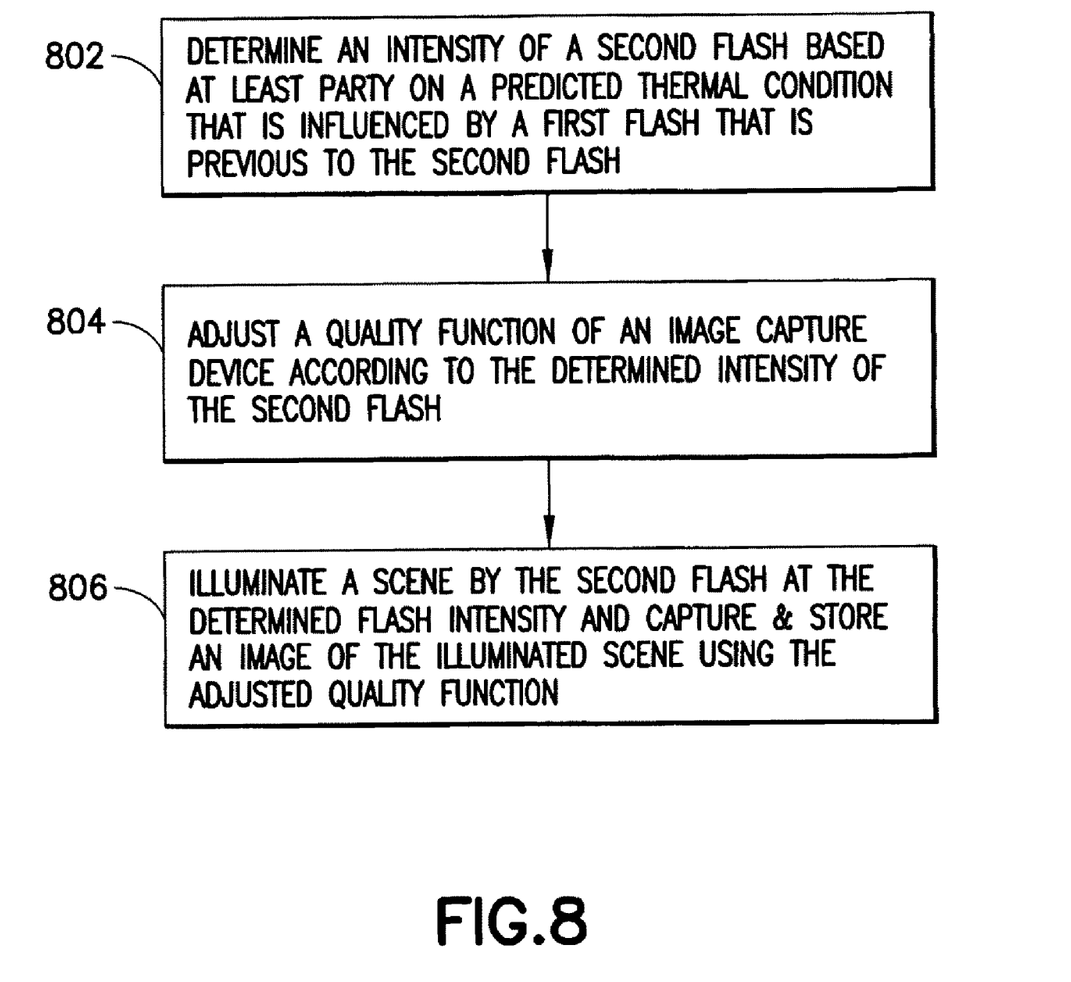
FIG. 8 illustrates process steps that are a bit broader than those of FIG. 6, according to another exemplary aspect of the invention.

FIG. 8 illustrates a broader conception of an exemplary embodiment of the invention whose broader steps include many of the particular embodiments detailed above. At block 802 an intensity of a second flash is determined based at least partly on a predicted thermal condition that is influenced by a first flash that is previous to the second flash. At block 804 a quality function of an image capture device is adjusted according to the determined intensity of the second flash. And at block 806, a scene is illuminated by the second flash at the determined flash intensity and an image of the illuminated scene is captured and stored using the adjusted quality function. As detailed above, the quality function may be an auto-exposure algorithm, which is compensated for the second flash intensity, and the second flash intensity is maximized in view of temperature limits and constraints due to the first flash which may be a pre-flash, a videolight/auto-focus assistance light, or both. The specific implementations detailed above by example as to how the prediction may be done (current/voltage applied, thermal sensor, etc.) are not limiting as to how this broader aspect of the invention may be accomplished.

Embodiments of the invention enable optimal use of the flash under all environmental conditions. The flash can be reliably used over multiple image captures, and the flash may be continually monitored and protected from thermal abuse during use. Image quality is improved in certain embodiments because a higher power flash is available more frequently than when designing the system for the worst-case ambient temperature as noted in background above. When used with super capacitor currents (about 2 amps per LED), light outputs approaching that of a Xenon flash can be achieved with an LED. Other embodiments using the super capacitors with LEDs provide better performance and also reduce the overall component cost and reliability of the design. Thermal reliability is also improved in some embodiments as the LED's junction temperature is continually monitored and kept within a safe operating region. This also reduces extended time for product thermal testing for new phone designs where embodiments are implemented in new products rather than retro-fitted to legacy devices.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. The process blocks at FIGS. 6, 7A-7B and 8 may be considered as functional circuitry blocks of such an integrated circuit. Whereas FIG. 1A illustrates a single processor 20, embodiments of the invention may be incorporated in a more particularized processor such as an image processor associated solely with the camera 26' (even separate from the ROIC 46), which may be in a slave relation to a master/general purpose processor of the overall mobile phone 10 or other host device.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention. Various embodiments and aspects detailed above may be used in various combinations, even beyond those combinations explicitly claimed herein. Additionally, process steps are detailed that may be executed in a different order than the order in which they are described above, and certain process steps may be done concurrently in whole or in part.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

I claim:

1. A method comprising:
   determining an intensity of a second flash based at least partly on a predicted thermal condition that is influenced by a first flash that is previous to the second flash;
   adjusting a quality function of an image capture device according to the determined intensity of the second flash; and
   illuminating a scene by the second flash at the determined flash intensity and capturing and storing an image of the illuminated scene using the adjusted quality function.

2. The method of claim 1, wherein the first flash is a pre-flash of a red-eye reduction mode of the image capture device.

3. The method of claim 1, wherein the predicted thermal condition is temperature due to the second flash, and the thermal condition is predicted from a measurement at a temperature sensor of temperature arising from the first flash, the temperature sensor disposed on a common substrate adjacent to a light emitting diode that fires the first flash and the second flash.

4. The method of claim 1, wherein the predicted thermal condition is temperature due to the second flash, and the thermal condition is predicted from an electrical parameter associated with the first flash and measured at an input or an output of a light emitting diode that fires the first flash and the second flash.

5. The method of claim 4, wherein the thermal condition is predicted from an output of an analog to digital converter that has input thereto a forward voltage of the light emitting diode and an output of a temperature dependant resistor disposed adjacent to the light emitting diode and on a common substrate that acts as a heat sink to the light emitting diode.

6. The method of claim 1, wherein the predicted thermal condition is temperature due to the second flash, and the thermal condition is predicted from an output of a thermal sensor disposed proximal to a light emitting diode that fires the first and the second flashes, and the prediction is calculated using a thermal model of the diode that relates junction temperature to power level applied to the diode.

7. The method of claim 1, wherein the predicted thermal condition is temperature due to the second flash, and the thermal condition is predicted from an electrical parameter associated with an auto focus assistance light prior to the first flash and measured at an input or an output of a light emitting diode that fires the first flash and the second flash.

8. The method of claim 1, wherein the predicted thermal condition is temperature due to the second flash, and the thermal condition is predicted from an electrical parameter associated with the first flash and measured at an input or an output of a light emitting diode that fires the first flash and the second flash and is further corrected for effects of equivalent series resistance within a super capacitor at low temperature, wherein the super capacitor is coupled to the light emitting diode.

9. The method of claim 1, wherein the quality function comprises an auto-exposure algorithm that controls an array of pixels of the image capture device.

10. The method of claim 1, wherein the quality function comprises at least one of gain of the image capture device; a white-balance algorithm that controls color matching of an array of pixels of the image capture device; and an image quality filter function that filters outputs from an array of pixels of the image capture device.

11. The method of claim 1, wherein the predicted thermal condition is temperature due to the second flash, and for the case that the predicted thermal condition exceeds a maximum temperature of a light emitting diode that fires the first flash and the second flash, the determined intensity of the second flash is constrained such that a calculated temperature at the light emitting diode due to the second flash assures that the maximum temperature is not exceeded.

12. The method of claim 1, wherein the predicted thermal condition is temperature for the second flash, the method further comprising measuring temperature due to the second flash and updating an algorithm related to the quality function based at least partly on a difference between the measured temperature due to the second flash and the predicted temperature due to the second flash.

13. The method of claim 1, further comprising using information related to temperature due to the second flash to update an algorithm stored in the memory that controls an autofocus drive system of the image capture device.

14. A memory embodying a program of machine readable instructions that when executed by a processor result in actions directed to operating an image capture device, the actions comprising:
   determining an intensity of a second flash based at least partly on a predicted thermal condition that is influenced by a first flash that is previous to the second flash;
   adjusting a quality function of an image capture device according to the determined intensity of the second flash; and
   illuminating a scene by the second flash at the determined flash intensity and capturing and storing an image of the illuminated scene using the adjusted quality function.

15. The memory of claim 14, wherein:
   the first flash is a pre-flash of a red-eye reduction mode of the image capture device;
   the predicted thermal condition is temperature due to the second flash; and
   the thermal condition is predicted from a measurement at a temperature sensor of temperature arising from the first flash or from an electrical parameter associated with the first flash and measured at an input or an output of a flash actuator that fires the first flash and the second flash.

16. The memory of claim 14, wherein the quality function comprises at least one of:
   an auto-exposure algorithm that controls an array of pixels of the image capture device;

gain of the image capture device;
a white-balance algorithm that controls color matching of an array of pixels of the image capture device; and
an image quality filter function that filters outputs from an array of pixels of the image capture device.

17. An apparatus comprising:
a processor configured to determine an intensity of a second flash of a flash actuator based at least partly on a predicted thermal condition that is influenced by a first flash of the flash actuator that is previous to the second flash, and to adjust a quality function according to the determined intensity of the second flash; and
an image capture device comprising a pixel array, a read-out circuit and the flash actuator that are controlled by the processor so as to illuminate a scene by the second flash of the flash actuator at the determined flash intensity so as to capture and store in a local memory an image of the illuminated scene using the adjusted quality function.

18. The apparatus of claim 17, wherein the first flash is a pre-flash of a red-eye reduction mode of the image capture device.

19. The apparatus of claim 17, wherein the predicted thermal condition is temperature due to the second flash, and the processor is configured to predict the thermal condition from a measurement at a temperature sensor of temperature arising from the first flash, the temperature sensor disposed on a common substrate adjacent to the flash actuator.

20. The apparatus of claim 17, wherein the predicted thermal condition is temperature due to the second flash, and the processor is configured to predict the thermal condition from an electrical parameter associated with the first flash and measured at an input or an output of the flash actuator.

21. The apparatus of claim 20, wherein the processor is configured to predict the thermal condition from an output of an analog to digital converter that has input thereto a forward voltage of the flash actuator and an output of a temperature dependent resistor disposed adjacent to the flash actuator and on a common substrate that acts as a heat sink to the flash actuator.

22. The apparatus of claim 17, further comprising a thermal sensor disposed proximal to the flash actuator;
wherein the predicted thermal condition is temperature due to the second flash, and the processor is configured to predict the thermal condition from an output of the thermal sensor and a thermal model of the flash actuator that relates junction temperature to power level applied to the flash actuator.

23. The apparatus of claim 17, wherein the predicted thermal condition is temperature due to the second flash, and the processor is configured to predict the thermal condition from an electrical parameter associated with an auto focus assistance mode of the flash actuator prior to the first flash and measured at an input or an output of the flash actuator.

24. The apparatus of claim 17, wherein the predicted thermal condition is temperature due to the second flash, and the processor is configured to predict the thermal condition from an electrical parameter associated with the first flash and measured at an input or an output of the flash actuator, wherein the processor is further configured to predict the thermal condition by correcting for effects of equivalent series resistance within a super capacitor at low temperature, wherein the super capacitor is coupled to the flash actuator.

25. The apparatus of claim 17, wherein the quality function comprises an auto-exposure algorithm stored in the memory that controls the pixel array.

26. The apparatus of claim 17, wherein the quality function comprises at least one of: gain of the image capture device; a white-balance algorithm stored in the memory that controls color matching of an array of pixels of the image capture device; and an image quality filter function stored in the memory that filters outputs from the pixel array.

27. The apparatus of claim 17, wherein for the case that the processor predicts the thermal condition so as to exceed a maximum temperature of the flash actuator, the processor is configured to set the determined intensity of the second flash such that a calculated temperature at the flash actuator due to the second flash does not cause the maximum temperature to be exceeded.

28. The apparatus of claim 17, wherein the processor is further configured to measure temperature due to the second flash and to update an algorithm stored in the memory and related to the quality function based at least partly on a difference between the measured temperature due to the second flash and the predicted temperature due to the second flash.

29. The apparatus of claim 17, wherein the processor is further configured to use information related to temperature due to the second flash to update an algorithm stored in the memory that controls an autofocus drive system of the apparatus.

30. A mobile terminal comprising the apparatus of claim 17.

31. An apparatus comprising:
processing means for determining an intensity of a second flash based at least partly on a predicted thermal condition that is influenced by a first flash that is previous to the second flash, and to adjust a quality function, executed by the processing means and stored in a memory means, according to the determined intensity of the second flash; and
image capturing means comprising a pixel means, read-out means, and flash actuating means for emitting the first flash and the second flash, said image capturing means under control of said processing means for illuminating a scene by the second flash at the determined flash intensity so as to capture and store in the memory means an image of the illuminated scene using the adjusted quality function.

* * * * *